RIPPLE-FREE SYNCHRONOUS DEMODULATOR CIRCUIT

Filed May 31, 1963

INVENTOR.
THOMAS FALK
BY Joseph Levinson
ATTORNEY

United States Patent Office 3,238,383
Patented Mar. 1, 1966

3,238,383

RIPPLE-FREE SYNCHRONOUS DEMODULATOR CIRCUIT

Thomas Falk, Norwalk, Conn., assignor to Barnes Engineering Company, Stamford, Conn., a corporation of Delaware Filed May 31, 1963, Ser. No. 284,642
6 Claims. (Cl. 307—88.5)

Figure 1:
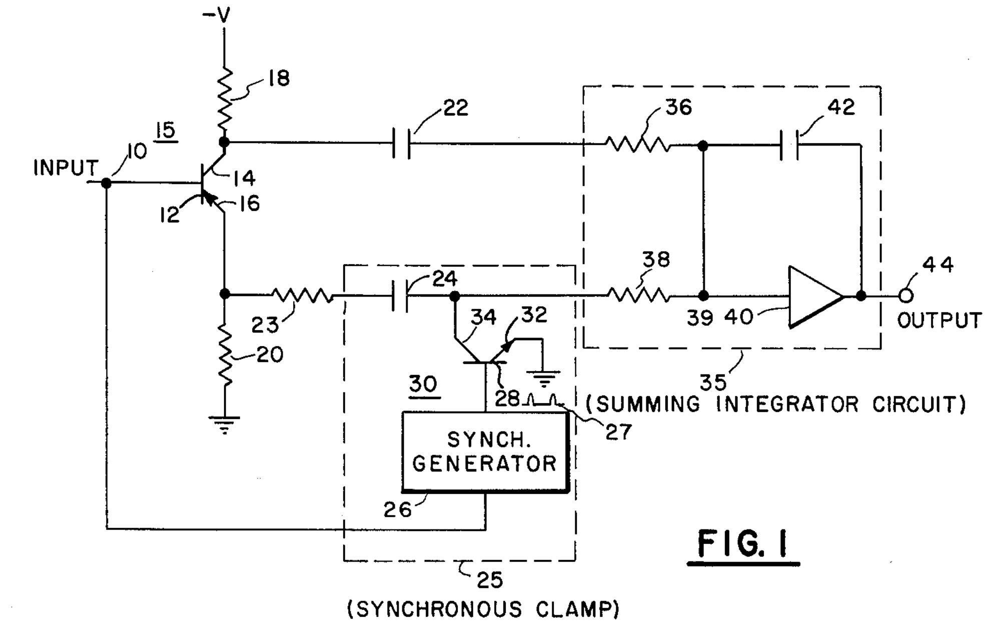

The invention described herein may be manufactured and used by or for the Government of the United States for governmental purposes without the payment to me of any royalty thereon.

This invention relates to a demodulator circuit for producing a substantially ripple-free direct current output from an alternating current input.

In the detection of radiant energy, for example, infrared energy, small direct current signals are received from a detector in response to incident radiation. The amplification of these signals often requires mechanical or electrical chopping to convert these signals so that A.C. amplifiers can be used. The signals resulting from the chopping, i.e., modulating at a given rate, are square wave signals. The rectification, or demodulation, of the ideal square wave produces no ripple in the rectified output. However, radiometric signals which are detected and processed in the aforesaid manner are not ideal square waves, but have a trapezoidal shape at best, due to the detector geometry and detector time constants which are on the order of the chopping frequency. Any deviations from the ideal square wave shape introduce ripple in the rectified output. The ripple may be substantially reduced using slow time constant filters. However, the use of slow time constant filters restricts greatly the output band width of the filter, slowing down the system response. To obtain a faster system response, faster time constants would be required in the filter, resulting in greater ripple.

Accordingly, it is an object of the present invention to provide a new and improved demodulator circuit for producing a substantially ripple-free direct current output from an alternating current input.

It is another object of this invention to provide a demodulator circuit which eliminates from the design consideration the normal interdependence between band width and ripple content.

Although full wave peak detector-filter combination circuits may be designed which produce less ripple in the output, the dynamic response of such circuits for decreasing signals would be slower than the response for increasing signals.

A further object of this invention is to provide a new and improved rectifier circuit which behaves as a single time constant filter for changes in signal level, producing an output which is substantially free of ripple for the frequency of the input signal thereto, or its harmonics.

In carrying out this invention in one illustrative embodiment thereof, a demodulator circuit is provided having a synchronous clamp which is driven in synchronism with an input signal applied thereto. A summing integrator circuit is provided which has applied thereto the output of the synchronous clamp along with the input signal, which is shifted 180° out of phase with the signal applied to the synchronous clamp. The alternating current components of the input signal are cancelled out in the summing integrator circuit, thereby providing an output which is substantially ripple-free.

Figure 2:
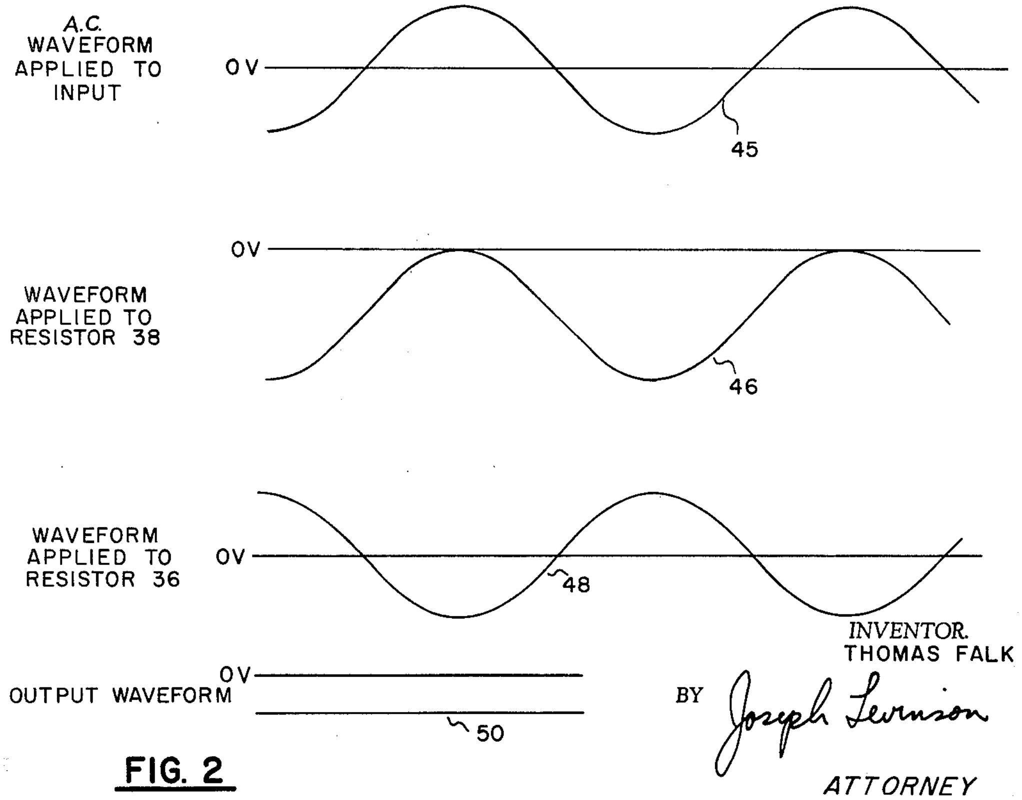

The invention, both as to organization and method of operation, together with further objects and advantages thereof, may best be understood by reference to the following description, taken in connection with the accompanying drawings, in which:

FIG. 1 is a schematic diagram of the demodulator circuit embodied in this invention, and FIG. 2 shows several waveforms which appear at various points in the circuit of FIG. 1.

Although the demodulator circuit of this invention has particular application to phase coherent alternating current signals, such as chopped radiation signals, its operation is described in connection with a sinusoidal signal which would normally present the greatest ripple problem in the rectified output thereof. The terms rectifier and demodulator are used interchangeably in this application. If the signal is chopped, then detection or demodulation might more aptly describe the process. However, if the signal is an alternating input without modulation, then rectification might be considered more correct. Since this invention may be used with either type of input, no distinction is made between rectification and demodulation because the invention applies to either one.

Referring now to FIG. 1, an alternating current signal is applied to the input terminal 10, which is connected to a base electrode 12 of a transistor 15. The transistor 15 may be the output of an amplifying system which contains more stages than the transistor 15, but for the purposes of this disclosure only a single transistor is shown. The transistor 15 includes an emitter electrode 16 connected through a resistor 20 to ground, and a collector electrode 14 connected through a resistor 18 to a source of negative potential. The output taken from the collector electrode 14 is applied via a coupling capacitor 22 to a resistor 36 in a summing integrator circuit 35. The output from the emitter electrode 16 is applied via a resistor 23 and a coupling capacitor 24 to a resistor 38 of the summing integrator circuit 35. The resistor 23 is small in magnitude as compared with resistor 38 and forms an RC-network with capacitor 24 so that the synchronous clamp 25 functions properly with the presence of noise in the input which would normally be the case when chopped radiation signals are processed. In the absence of noise at the input, resistor 23 would not be needed. The outputs appearing at the collector electrode 14 and the emitter electrode 16 are 180° out of phase. The transistor 15 is illustrated to show one means of obtaining this phase relationship between the outputs, the essential feature being that the two outputs be 180° out of phase.

The output from the emitter electrode 16 is synchronously rectified by a synchronous clamp 25 which includes a transistor 30 having a collector electrode 34 connected to the output of capacitor 24, a grounded emitter electrode 32, and a base electrode 28 connected to a synchronous generator 26. The synchronous generator 26 functions to generate a waveform 27 of pulses which switches on the transistor 30 in accordance with the peak positive excursions of the alternating current input. The input terminal 10 is shown in FIG. 1 to be coupled to the synchronous generator 26 to indicate that the generator is synchronized with the input signal applied at the input terminal 10. However, it will be obvious that if the circuit of FIG. 1 is in a larger system, the synchronous generator may be fed with an input signal from a different point as long as the phase and frequency are the same. The synchronous generator 26 provides the same waveform regardless of the amplitude of the input signal. Transistor 30 thus works as a synchronous switch which is switched on for only a small portion of a cycle corresponding to the peak positive input excursion of the input signal. This results in the clamping of the signal applied from the emitter electrode 16 to a positive maximum of zero amplitude, whereby the output therefrom will lie below the zero amplitude axis, thus producing rectification. The RC-network provided by resistor 23 and capacitor 24 prevents the enhancement noise by making the time constant of the synchronous clamp finite so that, during switching, noise at the input is averaged out instead of being amplified in accordance with its instantaneous peak value at that time. The noise referred to is that accompanying the input signal and not the ripple content which occurs in the process of A.C. to D.C. conversion.

The summing integrator circuit 35 comprises resistors 36 and 38, which are joined at a summing junction 39. The output is applied to a D.C. amplifier 40 which is shunted by a capacitor 42. The output of the summing integrator circuit appears at output terminal 44. The equivalent circuit of the capacitor 42 and the D.C. amplifier 40 might merely be represented by a capacitor connected to ground from which the output is taken. This would be the case where no amplification is required after rectification and filtering.

The wave forms of FIG. 2 will be utilized to explain the operation of the circuit of FIG. 1. An input waveform 45 is supplied to the base of transistor 15. The waveform 48 appearing at the collector electrode 14 is 180° out of phase with the waveform 45 which appears at the emitter electrode 16. Rectification, which takes place in the synchronous clamp 25, produces a waveform 46 which is applied to the resistor 38. The waveform 48, which is applied to resistor 36, is not demodulated, but is fed directly through the summing resistor 36, but is 180° out of phase with the A.C. component of the waveform 46 applied to the summing resistor 38. The summing integrator circuit 35 functions as a summing integrator in which the A.C. components of waves 46 and 48 are 180° out of phase, and cancel in the summing integrator circuit 35. For direct current there is no summing action, and the output at the output terminal 44 is D.C. without ripple. The gain of the D.C. amplifier 40 will be determined by the output requirements. Cancellation of the A.C. components at the summing junction 39 is most perfect if the ratio of resistance of resistors 18 and 20 equals the ratio of resistance of resistors 36 and 38 plus resistor 23, when resistor 23 is required. If the input impedance of the D.C. amplifier 40 is large compared to the resistance of resistor 38, the D.C. component of the half-wave synchronous rectifier 25 is only affected by the D.C. gain of the amplifier 40. By utilizing higher values for resistors 36 and 38, more efficient synchronous rectification occurs. The summing integrator circuit 35 acts as a single resistor-capacitance low-pass filter, with the time constant being a function of the resistor 38, the capacitor 42, and the voltage gain of the D.C. amplifier 40. This combination acts as a low-pass filter on changing signal levels. Accordingly, it is not necessary to compromise on a system with slow response or a fast system with a high ripple content when it is desired to follow the changing nature of the amplitude of the input signal to the circuit.

The circuit of this invention requires very few extra components as compared with conventional rectifier filter arrangements. A resistor 18 is required in the amplifier 15 to provide the out-of-phase input to the summing integrator circuit 35. The active filter in the summing integrator circuit 35 may be required in conventional systems if large and precise output time constants are needed. Such circuits may require electrolytic capacitors with inherent temperature instability, while the present circuit may utilize more stable paper or Mylar capacitors.

The rectifier circuit as embodied in this invention may be utilized in positioning devices which use D.C. feedback loop, in which little or no ripple can be tolerated. In such systems, in which the signal may be utilized to drive direct current motors in accordance with the presence or absence of a signal, if the ripple content is great enough, false actuation may result.

In infrared technology, where small amounts of incoming radiation are desired to be measured, the chopped radiation produces square wave signals from the detector which are not idealized, thus providing ripple in the rectified output, and causing errors in the process signal. The elimination of the ripple would require large time-constant circuits, which would slow the response of the system. Furthermore, the amplitude of the incoming signal may vary over a large range in accordance with the incident radiation. The present rectifier circuit eliminates the interdependence of design considerations regarding the bandwidth of the filter and the ripple content. The circuit of the present invention acts as a single time-constant resistance-capacitance filter for changes in signal level, yet contains substantially no ripple at the chopper frequency rate or its harmonics. As a practical matter, the ripple can be reduced by at least two orders of magnitude as compared with conventional full-wave rectifier-filter combinations.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A circuit for producing a substantially ripple-free direct current output from an alternating current input comprising (a) an amplifier having an input and first and second outputs in which the signals therefrom are 180° out of phase, (b) means applying an alternating current input signal to the input of said amplifier, (c) a summing integrator circuit, (d) means for coupling the first output of said amplifier to said summing integrator circuit, (e) means for coupling said second output to said summing integrator circuit, (f) said last named means including a synchronous clamp which is driven in synchronism with said alternating current input signal for clamping the peak amplitude of said input signal to a zero voltage level whereby the alternating current components of said input signal are cancelled in said summing integrator circuit to provide a substantially ripple-free direct current output signal from said summing integrator circuit.

2. The circuit of claim 1 wherein said alternating current input signal is a chopped radiation signal.

3. The circuit set forth in claim 1 wherein said summing integrator circuit comprises first and second resistors which are joined at one end to form a summing junction while the signals are applied to the unjoined ends and a capacitance which forms an R–C network with said resistors, said R–C network behaving as a single time-constant filter for changes in signal level.

4. A circuit for producing a substantially ripple-free direct current output from an alternating current input comprising (a) a first transistor having base, emitter, and collector electrodes, (b) means applying an alternating current input signal to said base electrode, (c) a source of potential and a first resistor connected to said collector electrode, (d) a second resistor connected between said emitter electrode and ground, (e) a synchronous switch for clamping the peak amplitude of said alternating current input signal to a zero voltage level, (f) means for activating said switch in synchronism with said alternating current input signal, (g) a third resistor and a first capacitor serially coupling said emitter electrode to said synchronous switch, (h) a summing integrator circuit, (i) a second capacitor coupling said collector electrode to said summing integrator circuit, and (j) means coupling said synchronous switch to said summing integrator circuit.

5. A circuit for producing a substantially ripple-free direct current output from an alternating current input comprising (a) a first transistor having base, emitter, and collector electrodes,
(b) means for applying an alternating current input signal to said base electrode,
(c) a source of potential and a first resistor connected to said collector electrode,
(d) a second resistor connected between said emitter electrode and ground,
(e) a synchronous switch,
(f) means for activating said switch in synchronism with said alternating current input signal,
(g) a third resistor and a first capacitor serially coupling said emitter electrode to said synchronous switch,
(h) a fourth resistor,
(f) a fifth resistor,
(j) a second capacitor coupling said collector electrode to said fourth resistor,
(k) means coupling said synchronous switch to said fifth resistor,
(l) a summing junction interconnecting said fourth and fifth resistors, (m) a direct current amplifier connected to said summing junction, and
(n) a third capacitor connected across said direct current amplifier.

6. The structure set forth in claim 5 wherein said synchronous switch comprises a transistor.

References Cited by the Examiner

UNITED STATES PATENTS

| | | | |
|---|---|---|---|
| 2,646,502 | 7/1953 | Bell | 328—165 |
| 2,874,284 | 2/1959 | Conger | 328—127 |
| 2,961,610 | 11/1960 | Hosenthien | 228—127 |
| 3,012,182 | 12/1961 | Ford | 321—47 |
| 3,031,142 | 4/1962 | Cohen et al. | 307—88.5 |
| 3,036,273 | 5/1962 | Holbrook et al. | 329—50 |

OTHER REFERENCES

IBM Technical Disclosure Bulletin, "Transistor Half Wave Rectifier," by Busch et al., vol. 1, No. 2, August 1958.

JAMES D. KALLAM, *Acting Primary Examiner.*

ARTHUR GAUSS, JOHN W. HUCKERT, *Examiners.*

J. D. CRAIG, *Assistant Examiner.*